Dec. 26, 1939.  L. W. MELCHER  2,185,034
REFRIGERATING APPARATUS
Filed May 11, 1939    6 Sheets-Sheet 1

Inventor
Lee W. Melcher
By. Fred Gerlach his Atty

Dec. 26, 1939.  L. W. MELCHER  2,185,034
REFRIGERATING APPARATUS
Filed May 11, 1939  6 Sheets-Sheet 3

Inventor..
Lee W. Melcher
By Fred Gerlach
Atty.

Dec. 26, 1939.  L. W. MELCHER  2,185,034
REFRIGERATING APPARATUS
Filed May 11, 1939  6 Sheets-Sheet 4

Inventor
Lee W. Melcher
By Fred Gerlach
his Atty.

Dec. 26, 1939.    L. W. MELCHER    2,185,034
REFRIGERATING APPARATUS
Filed May 11, 1939    6 Sheets-Sheet 5

Inventor
Lee W. Melcher
By Fred Gerlach
his Atty.

Dec. 26, 1939.  L. W. MELCHER  2,185,034
REFRIGERATING APPARATUS
Filed May 11, 1939   6 Sheets-Sheet 6

Inventor
Lee W. Melcher
By Fred Gerlach
his Atty

Patented Dec. 26, 1939

2,185,034

UNITED STATES PATENT OFFICE 2,185,034

REFRIGERATING APPARATUS

Lee W. Melcher, Oconomowoc, Wis., assignor to Waukesha Motor Company, Waukesha, Wis., a corporation of Wisconsin Application May 11, 1939, Serial No. 272,965

20 Claims. (Cl. 62—117)

The present invention relates generally to refrigerating apparatus for cooling or conditioning air. More particularly the invention relates to that type of refrigerating apparatus which is adapted to cool or condition the air within the body of a bus or like vehicle having a door closed compartment beneath the floor of its body, and as the main parts thereof, comprises: a compressor, internal combustion engine, evaporative condenser unit disposed in the door closed compartment beneath the floor of the bus body and mounted by way of a wheel equipped frame on a pair of tracks so that upon opening of the door of the compartment it may be wheeled from its normal or operative position in the compartment into an inspection position wherein parts thereof are disposed exteriorly of the compartment; an expansion valve equipped evaporator disposed in an air circulating, blower-equipped duct with discharge openings leading to the interior of the bus body, a high pressure refrigerant line leading from the compressor to the expansion valve of the evaporator and including the evaporative condenser and a receiver between the condenser and the expansion valve, and a low pressure refrigerant line leading from the outlet side of the evaporator to the suction side of the compressor.

One object of the present invention is to provide a refrigerating apparatus of this type which not only is an improvement upon and more efficient than that which forms the subject matter of an application for United States Letters Patent filed by me June 2, 1938, Serial No. 211,309, but also is less costly to produce and lighter and more compact.

Another object of the invention is to provide a refrigerating apparatus of the type under consideration in which the evaporative condenser in the high pressure refrigerant line and the radiator of the cooling system for the internal combustion engine of the unit are disposed in a box-like housing at the rear end of the unit, and the internal combustion engine which serves as the prime mover for the compressor is connected to drive a blower in such manner that the latter during operation thereof serves to draw air first into the compartment via a filter equipped opening in the door, then around the compressor and the engine for cooling purposes, then through a filter equipped opening in the rear end of the box-like housing, and finally past the coils of the evaporative condenser and through the radiator of the engine cooling system.

Another object of the invention is to provide a refrigerating apparatus of the last mentioned character in which the compressor is positioned in front of the engine and the blower is disposed rearwardly of the engine and has the outlet of its casing arranged to discharge the air downwardly through an opening in the compartment bottom.

Another object of the invention is to provide a refrigerating apparatus of the type and character under consideration in which the refrigerant receiver is fixedly mounted in the compartment at one side of the unit and is connected to the outlet side of the evaporative condenser by way of a flexible connection which permits of shift of the compressor-engine-condenser unit back and forth between its operative and inspection positions without disconnection of any part of the high pressure refrigerant line.

A further object of the invention is to provide a refrigerating apparatus of the aforementioned type in which the compressor-engine-condenser unit has associated with it novel latch devices which serve effectively and securely to lock the unit in its operative position and are of such design and character that the door for the compartment cannot be closed until they are in their locked position with respect to the unit.

A still further object of the invention is to provide a refrigerating apparatus which is generally of new and improved design.

Other objects of the invention and the various advantages and characteristics of the present apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views.

Figure 3:
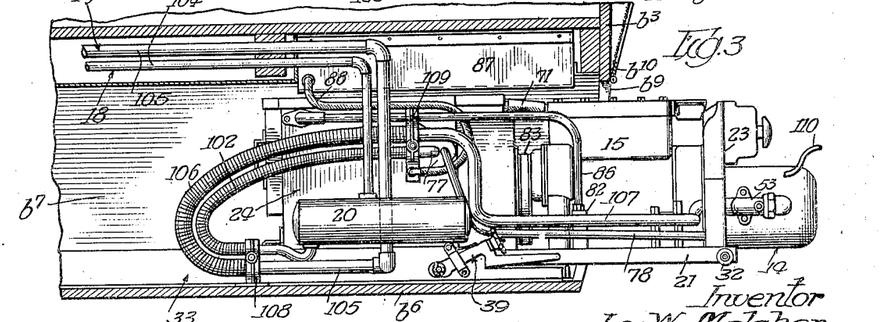
Figure 3 is a fragmentary vertical transverse section of the bus, showing the unit in its inoperative position wherein parts thereof are disposed exteriorly of the bus body and are accessible for inspection or repair.

The refrigerating apparatus which is shown in the drawings constitutes the preferred embodiment of the invention. It is designed and primarily adapted for cooling or conditioning air in connection with an automobile type bus B comprising an elongated body $b$ with supporting wheels $b^1$. Certain of the wheels are adapted to be driven by an internal combustion engine (not shown) in connection with propulsion of the bus from place to place. The body $b$ defines a compartment for passengers and includes a bottom $b^2$, a pair of sides $b^3$ and $b^4$, and a top $b^5$. The sides are spaced apart by the body bottom and top and embody bottom extensions which project beneath the bottom and together with said bottom, and a sub-bottom $b^6$ and a pair of side walls $b^7$, define a compartment $b^8$ under or beneath the bus body. As hereinafter described, the main operating parts of the apparatus are normally disposed in this compartment. Access to the compartment is provided by way of a doorway $b^9$ in the bottom extension of the body side $b^3$. This doorway is normally closed by means of a door $b^{10}$ which is hinged at the upper portion thereof so that it may be swung outwardly and upwardly from a closed position into an open position, as shown in Figure 3 of the drawings. The door is provided at the bottom thereof with a latch $b^{11}$ for securing it in its closed position and has a large opening $b^{12}$ for permitting air to enter the compartment $b^8$. A filter $b^{13}$ extends across and covers this opening and serves to filter the air which flows into the compartment via the opening. An elongated longitudinally extending duct $b^{14}$ is formed beneath the top $b^5$ of the body by way of a sub-top $b^{15}$. The rear portion of the sub-top is provided with a pair of screen equipped inlet openings $b^{16}$ for introducing air into the duct from the passenger compartment in the bus body and the rear side portions of the main top $b^5$ are provided with a pair of screen equipped inlet openings $b^{17}$ for introducing outside air into the duct $b^{14}$. A motor driven blower $b^{18}$ is disposed in front of the inlet openings $b^{16}$ and $b^{17}$ and operates during drive thereof to draw air into the duct via said openings and to force it under pressure into the passenger compartment in the bus body by way of grill equipped discharge openings $b^{19}$ in the sub-top $b^{15}$. As hereinafter described, the refrigerating apparatus, when in operation, operates to cool or refrigerate the air that passes or travels through the duct $b^{14}$ and thence into the passenger compartment in the bus body $b$. Said apparatus is wholly independent of the propelling means for the bus and comprises as its main operating parts a compressor 14, an internal combustion engine 15 for driving the compressor, an evaporative condenser 16, an evaporator 17, a high pressure refrigerant line 18 and a low pressure refrigerant line 19. The high pressure refrigerant line leads from the compressor to the evaporator and includes the evaporative condenser 16 and a receiver 20. The low pressure refrigerant line constitutes the refrigerant return and leads from the evaporator to the suction side of the compressor.

Figure 6:
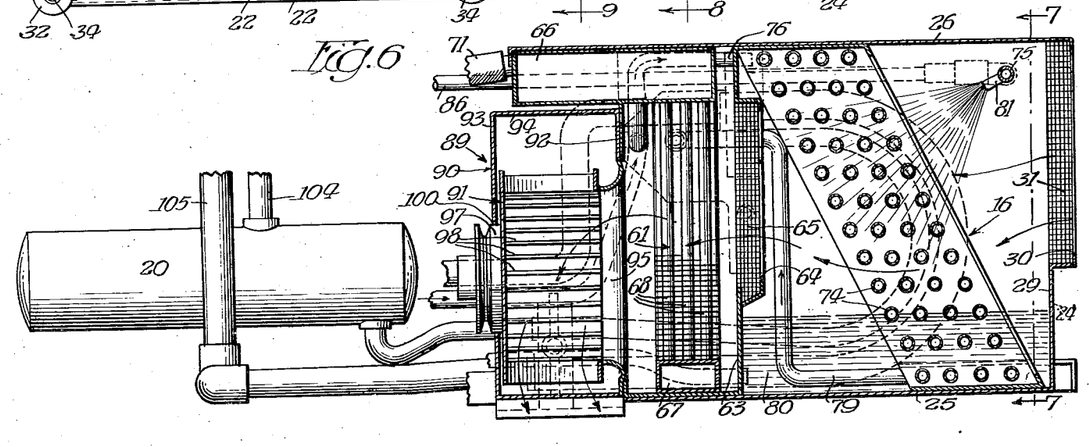
Figure 6 is a vertical longitudinal section of the evaporative condenser, the radiator of the cooling system for the internal combustion engine and the suction type blower illustrating the construction and arrangement thereof and showing the manner in which the blower operates during drive thereof to draw air past the coils of the evaporative condenser and then through the radiator.
Figures 8, 11:
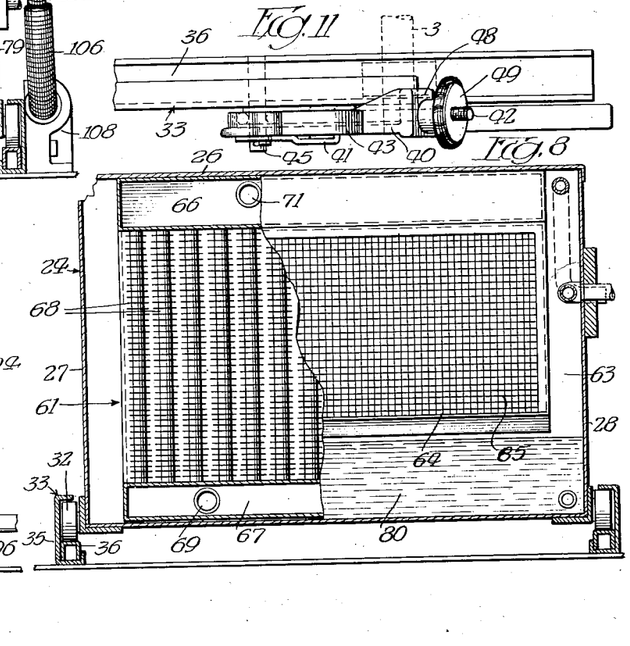
Figure 8 is a vertical transverse section taken on the line 8—8 of Figure 5 and illustrating the design and construction of the radiator of the cooling system for the internal combustion engine and also the design and construction of the filter equipped partition which extends transversely across the central portion of the box-like housing and serves to separate the evaporative condenser from the radiator.
Figure 11 is a plan view of the latch device of Figure 10.
Figure 9:
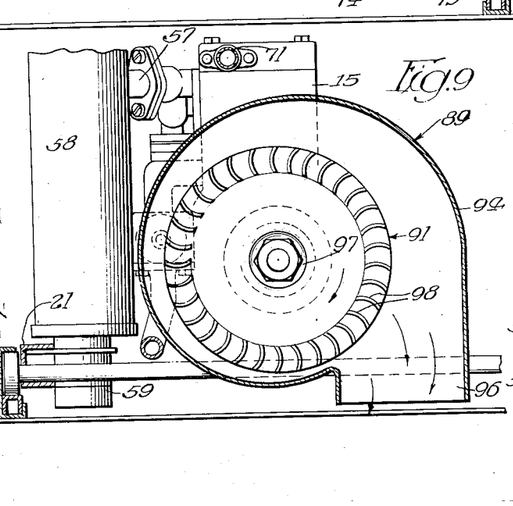
Figure 9 is a vertical transverse section taken on the line 9—9 of Figure 5 and showing the design, construction, and arrangement of the suction type blower for drawing air past the compressor and engine and then through the box-like housing for the evaporative condenser and the radiator.

The compressor 14, the internal combustion engine 15 and the evaporative condenser 16, are in the form of a unit and are mounted on an elongated frame 21. The latter comprises a pair of laterally spaced parallelly arranged side members 22 and is positioned over the sub-bottom $b^6$ in alignment with the doorway $b^9$ for the compartment $b^8$. The side members are suitably cross-connected and support an instrument panel 23 at their front ends and a box-like housing 24 at their rear ends. The instrument panel 23 extends upwardly in a vertical plane, as shown in the drawings, and is rigidly or fixedly secured to the front ends of the side members 22 of the frame. The housing 24 encloses the evaporator 16 as well as other parts of the apparatus and consists of a bottom 25, a top 26, a pair of sides 27 and 28, and a rear end wall 29. The latter are formed of sheet or plate metal and are secured together by welding or in any other suitable manner. The rear end wall 29 has in the upper portion thereof an air inlet 30 and the latter, as shown in Figure 6, is provided with a filter 31 for filtering air prior to entry into the interior of the housing 24. The frame 21 is supported by way of a set of wheels 32 and a pair of tracks 33 so that upon opening of the door $b^{10}$ it is shiftable transversely of the bus body and through the doorway $b^9$ into a position wherein its front end is exteriorly disposed with respect to the compartment $b^8$ and the parts of the apparatus on its front end are exposed for inspection or repair. The wheels 32 are preferably six in number and are positioned two at the front ends of the frame side members 22, two at the rear ends of such members, and two at the central portions of the side members. They are mounted on the stub axles 34 and fit within and travel along the tracks 32. The stub axles are welded to the side members 22 of the frame and project outwardly therefrom. The tracks 32 are arranged in parallel and laterally spaced relation and are fixed to the sub-bottom $b^6$ of the bus body so that they extend transversely of the body and are aligned with the doorway $b^9$. They comprise outer members 35 of C-shaped cross-section, and inner members 36 of U-shaped cross-section. The outer members consist of vertically extending webs and inwardly extending top and bottom flanges, as shown in Figures 8 and 9. The inner members 36 overlie and are welded to the bottom flanges of the outer members 35. They support the bottom portions of the wheels 32 and are conterminous with the outer members 35. The top flanges of the outer members of the tracks 33 overlie the top portions of the rollers and prevent the compressor-engine-condenser unit from tilting downwards when it is wheeled outwards through the doorway $b^9$ into its inspection position. Outward movement of the unit is limited or restricted by means of coacting stops (not shown). The outer ends of the stub axles for the front wheels 32 embody extensions 37 which coact with notches 38 in the front ends of the webs of the outer track members 35 to limit inward movement of the unit.

Figure 10:
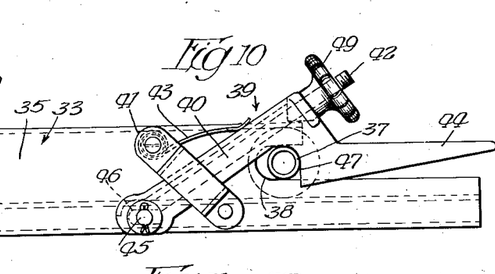
Figure 10 is a side view of one of the latch devices for securing or locking the compressor-engine-condenser unit in its operative position within the compartment.
Figure 12:
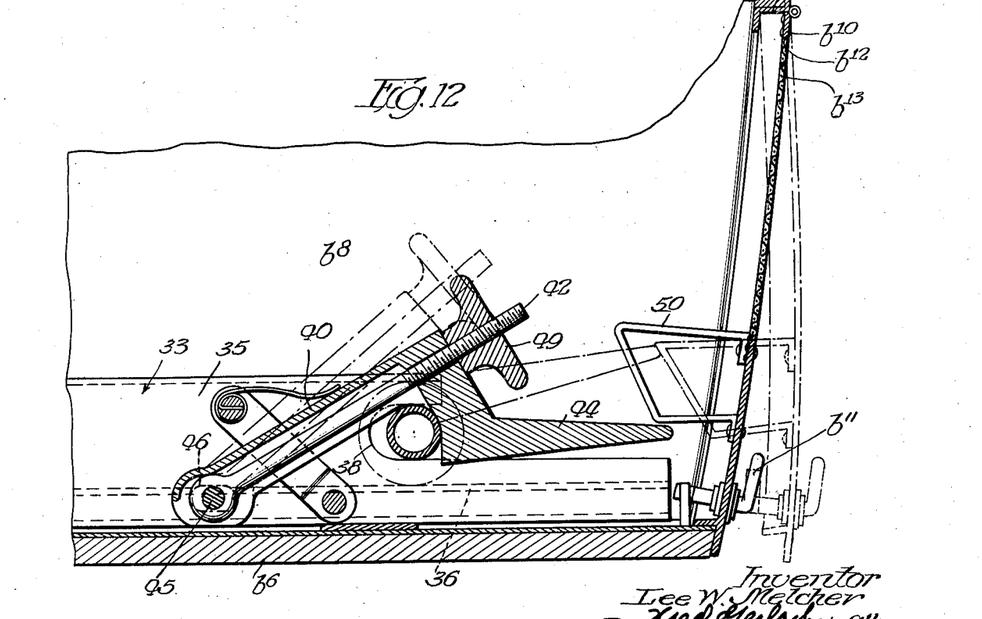
Figure 12 is an enlarged side view of the latch device of Figures 10 and 11, illustrating the manner in which such device operates to prevent closing of the compartment door when in its unlatched position.
Figure 13:
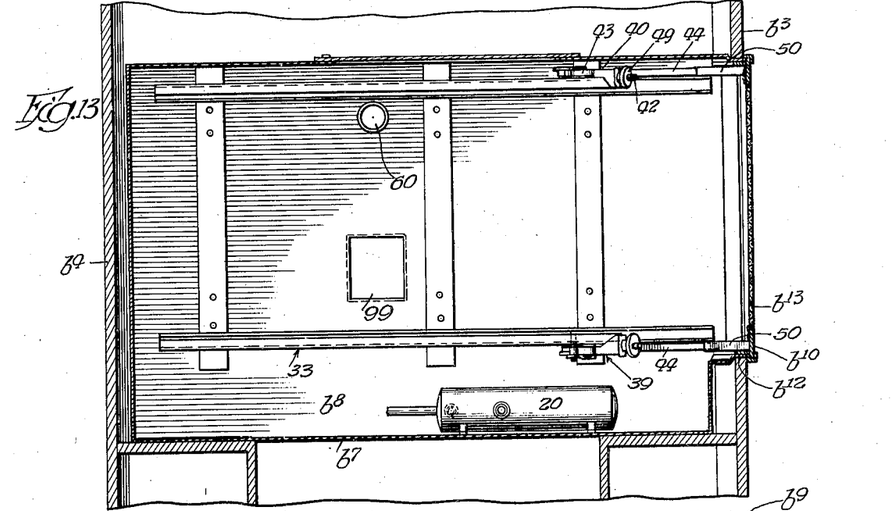
Figure 13 is a plan view of the portion of the sub-bottom of the bus body which defines the bottom of the compartment for the compressor-engine-condenser unit.

In order to lock the unit in its normal or operative position in the compartment $b^8$ a pair of latch devices 39 is provided. These devices are located at the front end of the frame 21 and each comprises a latch 40, a strap 41, an I-bolt 42, and a leaf spring 43. The latches 40 are located alongside of, and extend substantially longitudinally of the front end portions of the webs of the outer track members 35. The outer ends of the latches are shaped to form handles 44 and the inner ends of the latches are pivotally mounted on studs 45 so that the latches are free to swing up and down. The studs are secured to and project outwardly from the webs of the outer track members 35, as shown in Figure 10, and extend through substantially horizontal slots 46 in the rear ends of the latches. The central portions of the latches are shaped or formed to provide downwardly facing notches 47 which are adapted to receive the extensions 37 at the inner ends of the stub axles for the front wheels of the frame 21. The slots 46 permit the latches to move longitudinally to a limited extent. The notches 47 are so shaped that when the extensions 37 are disposed therein and the latches are shifted rearwards the latches are held in their locked position and cannot be swung upwards. To release the latches in connection with outward shift of the compressor-engine-condenser unit it is only necessary to pull or shift the latches forwards and then swing them upwards so as to free the extensions 37 from the notches 47. The handles 44 at the front ends of the latches permit the latches to be readily gripped in connection with manipulation or swinging thereof. The straps 41 extend around or straddle the rear end portions of the latches and serve to control or restrict the latches so that they can only be swung upwards sufficiently to permit of disengagement of the extensions 37 from the notches 47. The ends of the straps are in the form of L-shaped ears which fit against and are welded to the front portions of the webs of the outer track members 35. The I-bolts are positioned in parallel relation with the rear ends of the latches and have the eyes thereof mounted pivotally on the studs 45. The shanks of the I-bolts extend through centrally apertured lugs 48 on the central portions of the latches and embody handle equipped nuts 49. Because of the arrangement of the I-bolts the nuts when tightened serve to urge rearwards the latches and thus lock the latter in their operative or locking position. To release the latches it is only necessary to release the handle equipped nuts 49, and then, as previously pointed out, move the latches forwards and upwards. The leaf springs 43 bear against the rear ends of the latches and are so mounted or arranged that they serve to urge the latches downwards into their locking position. The handles 44 at the front ends of the latches coact with a pair of brackets 50 on the lower portion of the door $b^{10}$ to control the door so that it cannot be closed and latched in place unless the latches 40 are in their operative or locking position. As shown in Figure 12, the brackets 50 extend inwardly from the door and are arranged so that they overlie the handles 44 when the door is in its closed position and the latches are in their locking position. In the event that the latches are not in their locking position, the handles 44 are so angularly positioned that they strike the brackets and thus prevent closing of the door. The lower faces of the handles are upwardly and outwardly inclined with the result that when the compressor-engine-condenser unit is shifted rearwards into its operative position, the extensions 37 on the outer ends of the stub axles for the front wheels engage such faces and swing the latches upwards by a camming action. As soon as the extensions move into registry with the notches 47 as the result of the unit being shifted rearwards or inwards to its fullest extent the leaf springs 43 snap the latches downwards into their operative or locking position. The latch devices 39 serve effectively and securely to lock the compressor-engine-condenser unit in its operative position and so coact with the brackets 45 on the lower portion of the door $b^{10}$ that the door cannot be closed unless the latches 40 are in their locking position. The wheels 32 and the tracks 33 constitute simple means for supporting the unit so that it is shiftable back and forth from its operative position within the compartment $b^8$ and its inspection position wherein parts thereof are exteriorly disposed with respect to the bus body.

Figure 4:
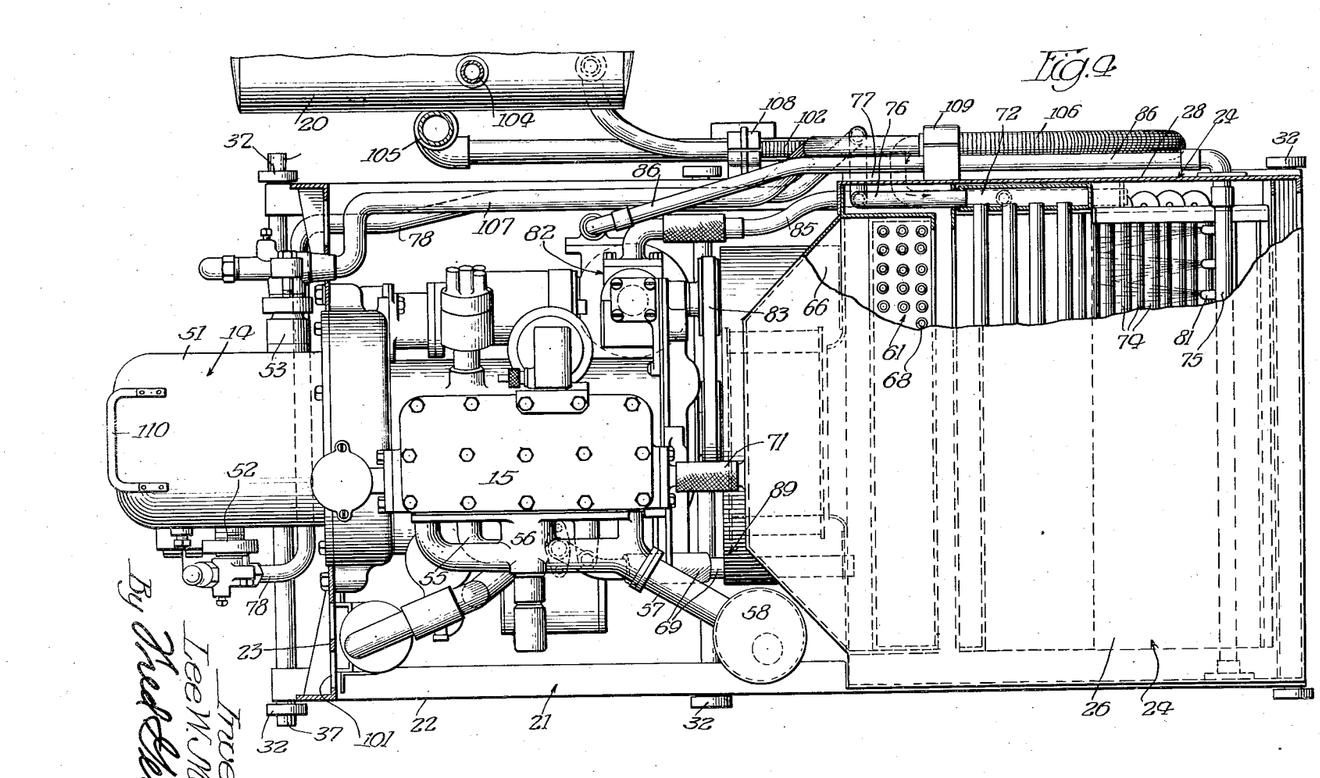
Figure 4 is a plan view of the compressor-engine-condenser unit, parts being broken away and shown in section for purposes of illustration.
Figure 5:
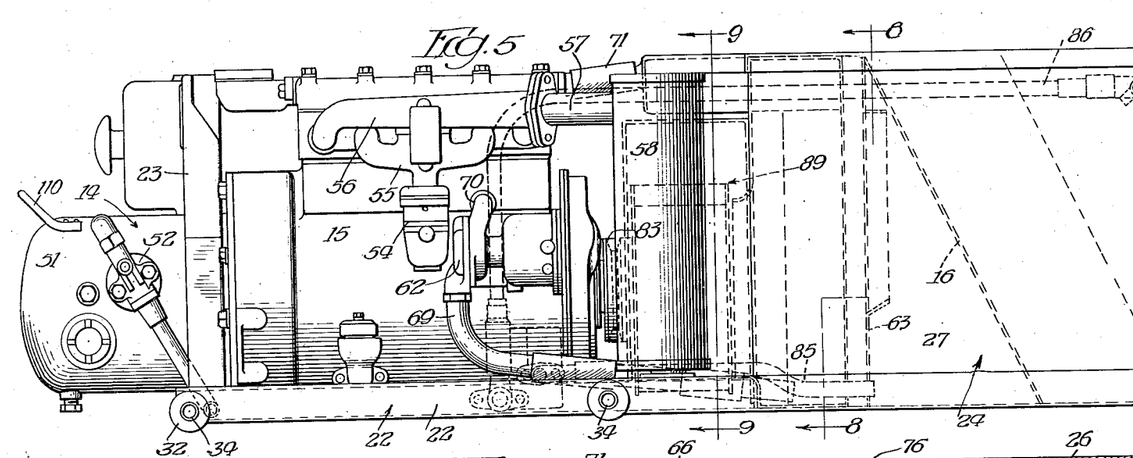
Figure 5 is a side view of the unit.

The compressor 14 is of the rotary vane type and is located at the front end of the frame 21. It extends through a hole in the instrument panel 23 (as shown in Figure 4) and comprises a casing 51 and a vane equipped rotor (not shown). The casing of the compressor is positioned immediately inwards of the air filter $b^{12}$ on the compartment door $b^{10}$ and is provided with a refrigerant inlet fitting 52 and a refrigerant outlet fitting 53. The inlet fitting is connected to the discharge end of the low pressure refrigerant line 19 and the outlet fitting is connected to the inlet end of the high pressure refrigerant line 18. When the rotor of the compressor is driven, the vanes thereof operate to draw the refrigerant from the low pressure refrigerant line and to supply it in highly compressed gaseous form into the inlet end of the high pressure refrigerant line 18. The engine 15 is mounted on the frame 21 between the compressor and the box-like housing 24. It extends longitudinally of the frame and has the front end of the crank shaft thereof connected to the vane equipped rotor of the compressor so that it operates when placed in operation to drive the compressor. At one side the engine is provided with a carburetor 54, an intake manifold 55, and an exhaust manifold 56. The carburetor and intake manifold serve to supply gaseous fuel into the combustion chamber portions of the cylinders. The exhaust manifold operates to conduct from the engine the various exhaust gases and is connected by a pipe 57 to the upper end of a vertically extending muffler 58. This muffler is located immediately adjacent the front end of the housing 24 and is provided at its lower end with an outlet nipple 59. When the compressor-engine-condenser unit is in its operative or normal position in the compartment $b^8$ this nipple 59 registers with a thimble equipped hole 60 in the sub-bottom $b^6$ of the bus body $b$. As a result of this arrangement, the exhaust gases or products of combustion flow downwards from the nipple 58 through the hole 60 to atmosphere and are hence not discharged into the compartment $b^8$. For cooling purposes the engine is provided with a cooling system. The latter embodies a radiator 61 and a pump 62. The radiator is located in the front end of the housing 24 and is separated from the evaporative condenser 16 by a partition 63. The latter is suitably secured at the margins thereof to the top, bottom and sides of the housing and has in the upper portion thereof an opening 64 whereby air after entering the rear portion of the housing via the opening 30 and passing by the evaporative condenser, is permitted to flow past the radiator. An air filter 65 extends across the opening 64 and serves to filter the air prior to passage thereof past the radiator. The radiator comprises an upper header 66, a lower header 67, and a plurality of vertically extending fin-equipped tubes 68 between the two headers. The lower header 67 is connected by a pipe 69 to the inlet side of the pump 62 and the outlet side of the pump is connected by a pipe 70 to the usual jacket around the cylinders of the engine. A pipe 71 extends between and serves to connect the jacket of the cylinder head of the engine to the upper header 66 of the radiator 61. The pump is connected for drive by the engine and serves when in operation to circulate a cooling medium such as water through the jacket around the cylinders, then through the jacket in the cylinder head, then through the pipe 71 to the upper header 66, then through the fin-equipped tube 68 to the lower header 67, and then through the pipe 69 back to the pump. The carburetor of the engine is supplied with fuel by way of a flexible pipe (not shown) which permits the compressor-engine-condenser unit to be shifted back and forth between its operative and inoperative positions without disconnection of such pipe. The engine is controlled by way of other connections (not shown) which are also flexible like the fuel supply pipe.

Figure 7:
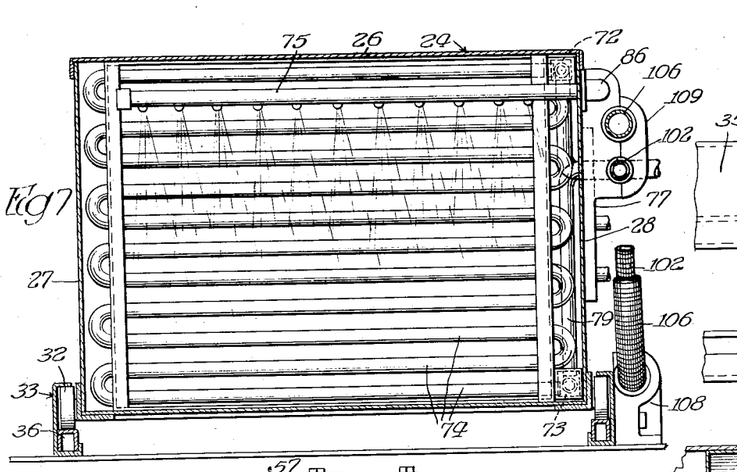
Figure 7 is a vertical transverse section taken on the line 7—7 of Figure 6 and showing the arrangement of the coils of the condenser.

The evaporative condenser 16 is located in the box-like housing 24 between the partition 63 and the rear end wall 29. It comprises an upper header 72, a lower header 73, a set of sinuous or serpentine coils 74, and a spray pipe 75. The coils, as shown in Figures 4 and 6, extend for the most part horizontally and are connected at their upper ends to the upper header 72. The lower ends of the coils are connected to, and communicate with, the lower header 73. As shown in Figure 7, the two headers are located adjacent the side 28 of the housing. The upper header is connected by a pipe 76 to one nipple of a two nipple fitting 77 and communicates with the pressure side of the compressor by way of a pipe 78 which extends between the one nipple and the outlet fitting 52 on the compressor casing. The lower header 73 of the evaporative condenser is located in the rear bottom portion of the housing 24 and is connected by a pipe 79 to the other nipple of the fitting 77. The rear portion of the housing bottom 25 and the lower portions of the partition 63, the sides 27 and 28, and the rear or inner end wall 29 form or define a sump 80 for a column of water. The coils 74 of the condenser extend upwardly and forwardly from this sump and overlie the latter, as shown in Figure 6. The spray pipe 75 extends transversely across the upper rear corner of the housing. It embodies a plurality of forwardly and downwardly extending spray nozzles 81 and is supplied with water under pressure from the sump by way of a pump 82. This pump is mounted on the rear end of the engine 15 and is connected for drive by the engine by way of a belt and pulley connection 83 between its rotor and the rear end of the crank shaft of the engine. The casing of the pump 82 is provided with an inlet and an outlet and these are connected respectively to the sump 80 and the spray pipe 74 by way of a pair of pipes 85 and 86. When the engine 15 is in operation the pump 82 operates to draw water from the sump 80 through the pipe 85 and then to deliver such water under pressure through the pipe 86 to the spray pipe 75. From this pipe the pumped water is jetted onto the coils 74 of the condenser by way of the nozzles 81. As the result of the cooling effect which is produced by the evaporation of the water sprayed onto the coils the refrigerant flowing through the coils is condensed or liquefied. The pipes 78 and 76, the headers and coils of the condenser, and the pipe 79, constitute and form a part of the high pressure refrigerant line 18. The sump 80 is supplied with water from a supply tank 87. This tank is disposed in the compartment $b^8$ and over the compressor-engine-condenser unit and is suitably secured in place under the bus bottom $b^2$. A flexible hose 88 serves to connect the tank 87 to the sump 80. The discharge end of this hose is provided with a float controlled valve (not shown) whereby the flow of water into the sump from the tank 87 is so controlled that the water in the sump is maintained at a constant level.

In order to draw air into the compartment $b^8$ via the filter equipped opening $b^{12}$ and then cause the air to flow past the evaporator condenser 16 and the radiator 61, a blower 89 is provided. This blower is mounted on the frame 21 between the rear end of the engine 15 and the radiator. It comprises a casing 90 and a rotor 91 and is located at one side of the muffler 58, as shown in Figure 4. The casing serves to close the front end of the box-like housing 24 and embodies a rear end wall 92, a front end wall 93, and a substantially continuous side wall 94 between the two end walls. The rear end wall 92 embodies an annular air inlet 95 and has its margins arranged in abutment with the bottom of the radiator header 66 and the bottom and sides of the housing 24. The side wall 94 serves to hold the front and rear end walls in laterally spaced relation and has in the bottom portion thereof a downwardly facing air outlet 96. The rotor 91 is mounted in the housing and is provided with a hub 97 and an annular series of vanes 98 of arcuate cross-section. The vanes surround the air inlet 95 and operate during drive of the rotor to draw air through the inlet 95 and then to force the air downwards through the outlet 96. The latter when the compressor-engine-condenser unit is in its operative or normal position in the compartment $b^8$, overlies and registers with a thimble surrounded or equipped hole 99 in the sub-bottom $b^6$ of the bus body and as a result the air under pressure emanating from the outlet flows downwards through said hole 99 to atmosphere. The hub 97 of the rotor extends through a hole 100 in the front end wall 93 of the blower casing and is connected to the rear end of the crank shaft of the engine so that the rotor is driven by and conjointly with the engine. When the blower is in operation as a result of drive or operation of the engine it causes air from the outside of the bus body to flow into the outer end of the compartment $b^8$ via the filter equipped opening $b^{12}$ in the door $b^{10}$, then to flow around and past the compressor 14 and the engine 15, then to travel around the outside of the box-like housing 24 to the inner end of the compartment $b^8$, then to flow into the rear end of the housing through the filter equipped opening 30 in the rear end wall 29 of the housing, then to flow past the serpentine coils 74 of the condenser, then to flow through the filter equipped opening 64 in the partition 63 and past the tubes 68 of the radiator, and finally to flow downwards and out of the compartment $b^6$ via the hole 99 in the sub-bottom $b^6$. The instrument panel 23 at the front end of the frame 21 embodies a group of holes 101 therein to permit the air entering the front end of the compartment $b^8$ to flow around and in close proximity to the compressor and engine. Because of the flow of air past the compressor and the engine, cooling of these two parts of the apparatus is effected. The air which is sucked or drawn into the housing 24 via the filter equipped opening 30 assists in the evaporation of the water sprayed against the condenser coils 74 and because of its heated condition due to prior contact with the compressor and engine materially hastens evaporation of the sprayed water. The air passing past the coils of the radiator because it is laden with a certain amount of moisture produces a cooling action whereby the radiator is caused effectively and efficiently to fulfill its intended purpose. By having the blower 89 arranged so that it draws the air past the coils of the condenser and the coils of the radiator after flow thereof by the compressor and engine, the air surrounding the engine is not moisture laden and hence no moisture which might produce a corrosive action within the cylinders of the engine is entrained by the air entering the carburetor 54. An advantage of having the air pass the compressor and engine before it passes the condenser and radiator is that the air is heated by contact with the compressor and engine and hence produces a comparatively high evaporating effect upon entry into the housing 24.

The receiver 20 is fixedly secured in the compartment $b^8$ adjacent the side 28 of the housing 24. It serves as a storage receptacle for the liquefied refrigerant and is connected to the nipple to which the discharge end of pipe 71 is connected by way of a flexible tubular connection 102. The latter forms a part of the high pressure refrigerant line 18 and permits the compressor-engine-condenser unit to be shifted back and forth between its operative and inspection positions without disconnection.

Figure 1:
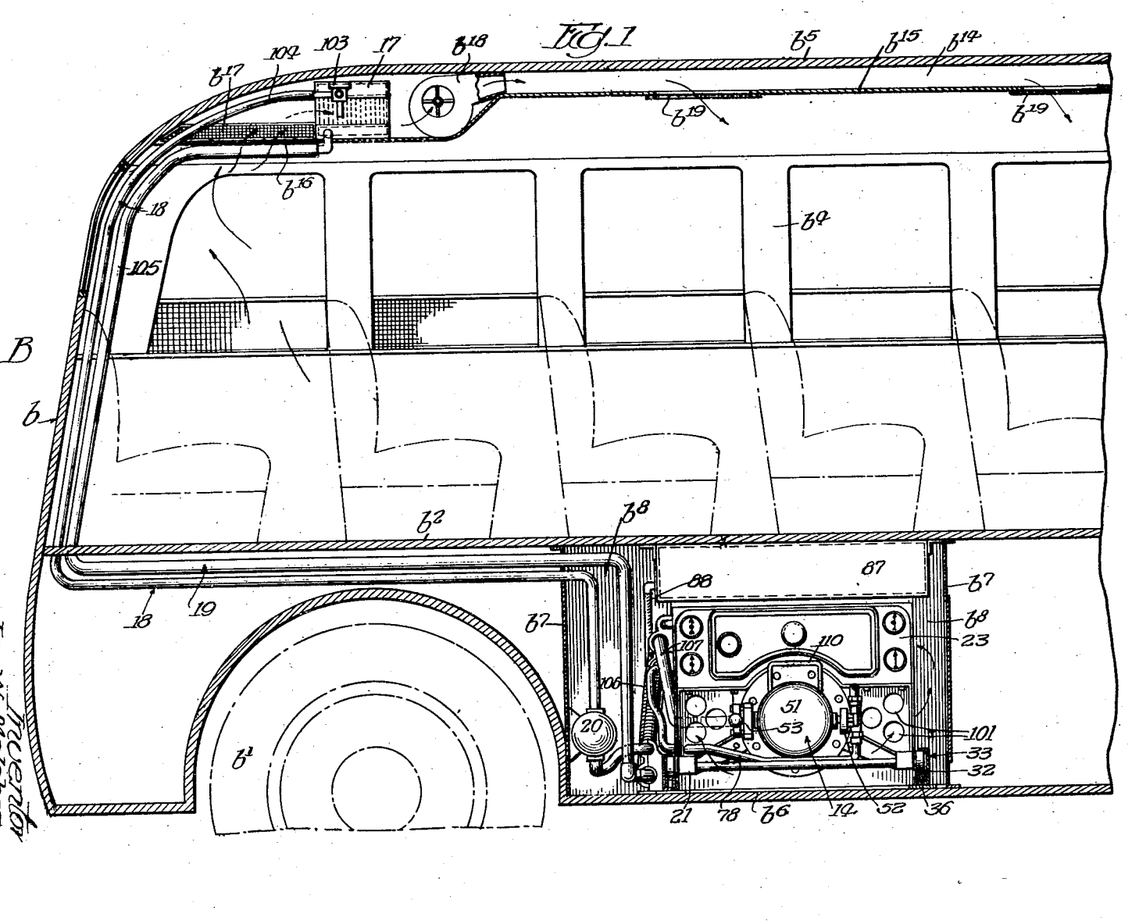
Figure 1 is a fragmentary vertical longitudinal section of an automobile type bus having applied thereto a refrigerating apparatus embodying the invention.
Figure 2:
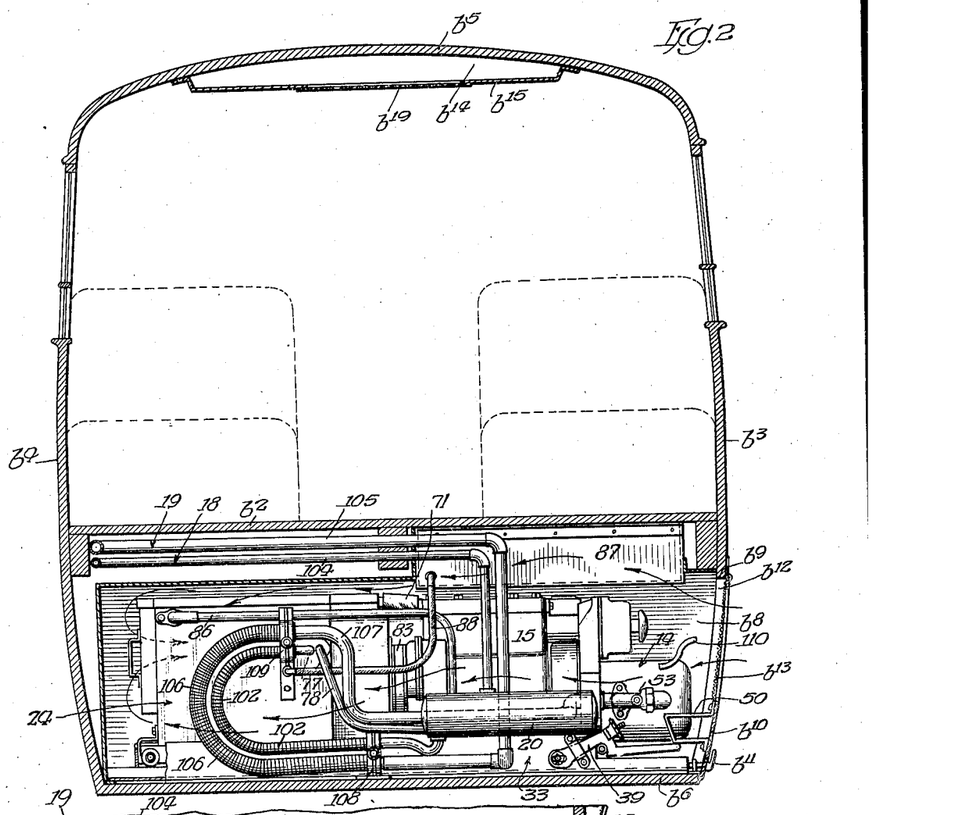
Figure 2 is a vertical transverse section of the bus illustrating the compressor-engine-condenser unit in its normal operating position in the door closed compartment beneath the bottom of the bus body.

The evaporator 17 is located in the duct $b^{14}$ between the inlet openings $b^{16}$ and $b^{17}$ and the motor driven blower $b^{18}$. It is in the form of a coil and has an expansion valve 103 at the inlet side thereof. This valve is connected to the receiver 20 by pipe 104 and is adapted to cause the compressed refrigerant to enter the evaporator in an expanded condition. The pipe 104 constitutes a part of the high pressure refrigerant line 18. The discharge or outlet side of the evaporator is connected to the inlet fitting 53 on the casing 51 of the compressor 14 by a pipe 105, a flexible tubular connection 106, and a pipe 107. The discharge end of the pipe 105 is located in the compartment $b^8$ and is connected to a bracket 108 adjacent the receiver 20. The connection 106 extends around the flexible connection 102 and like the latter, permits of shift or sliding movement of the compressor-engine-condenser unit without disconnection of any part of the low refrigerant line 18. The discharge end of the connection 106 is connected to a bracket 109 on the side 28 of the housing 26. The pipe 107 extends between and is connected to the discharge end of the connection 106 and the fitting 53 and it together with the pipe 105 and the flexible tubular connection 106 constitutes the low pressure refrigerant line 19. The brackets 108 and 109 also serve to support the flexible connection 102, as shown in Figures 2 and 3.

The operation of the apparatus is as follows: When it is desired to cool or chill the air in the passenger compartment in the body of the bus B, the internal combustion engine 8 is started. As soon as the engine is in operation the compressor 14 operates to compress the refrigerant and to force it through the evaporative condenser 16 into the receiver 20. From the receiver the refrigerant flows under pressure via the high pressure refrigerant line 18 to the expansion valve 103 and thence through the evaporator 17. Expansion or boiling of the refrigerant takes place within the evaporator and as a result of this the refrigerant serves so to cool the evaporator coil that the latter in turn absorbs the heat of the air flowing through the duct $b^{14}$ into the passenger compartment of the bus. After flowing through the evaporator the spent refrigerant at low pressure flows through the line 19 back to the compressor where it is again compressed. During drive of the engine the evaporative condenser operates by the spraying and evaporation of water on the coil 74 to condense the refrigerant prior to passage thereof to the receiver. During operation of the engine the blower 89 operates, as hereinbefore described, to draw air from the outside of the bus first through the filter equipped opening $b^{12}$ in the door $b^{10}$ into the front end of the compartment $b^8$, then past and around the compressor 14 and the engine 16, then rearwards past the box-like housing 24, then into the rear end of the housing via the screen equipped opening 30, then past the condenser coil 74 and through the filter equipped opening 64 into the space between the partition 63 and the rear end wall 92 of the casing of the blower, and finally past the tubes of the radiator and then downwardly through the hole 99 in the sub-bottom $b^6$ to atmosphere. The radiator 61 serves to cool the water in the engine cooling system and the filter 65 operates as an arrester for the moisture in the air passing into the radiator space of the box-like housing 24 from the space in which the evaporative condenser is located. When it is desired to inspect or repair the compressor or engine the door $b^{10}$ is unlatched and swung upwardly into its open position. Thereafter the handle equipped nuts 49 on the distal ends of the I-bolts 42 are released to free the latches 40 of the latch devices 39. After this operation the handles 44 of the latches are gripped and swung upwards so as to free the extensions 37 with respect to the notches 47 in the central portions of the latches. This last operation serves to free the compressor-engine-condenser unit so that it may be pulled bodily from the compartment $b^8$ into its inspection position. A handle 110 is secured to the casing 51 of the compressor 14 and this serves to facilitate shift of the unit into and out of its operative position. After repair and inspection of various parts of the unit, the unit is shifted back into its operative or normal position in the compartment merely by exerting pressure on the handle 110. If after return of the unit to its operative position the operator should fail to swing the latches 40 into their locking position it is impossible for the operator to close or latch the door $b^{10}$ because of abutment of the brackets 50 against the ends of the handles 44.

The herein described refrigerating apparatus is extremely efficient in operation and because of the arrangement and design of the various operating parts thereof has a comparatively large capacity for its size. It is light in weight and occupies but a comparatively small space.

Whereas the apparatus has been described in connection with an automobile type bus, it is to be understood that it may be used in connection with any other type of vehicle and also in other capacities. It is also to be understood that the invention is not to be restricted to the details set forth, since these may be modified within the scope of the appended claims, without departing from the spirit and scope of the invention.

Having thus described the invention, what I claim as new and desire to secure by Letters Patent is:

1. A refrigerating apparatus comprising in combination means forming a compartment having an air inlet and an air outlet, a housing provided with an inlet opening and disposed in the compartment remotely with respect to the air inlet for the latter, a refrigerant compressor disposed in the compartment adjacent to said air inlet and having high and low pressure refrigerant lines leading from and to it respectively, a prime mover positioned in the compartment and connected to drive the compressor, an evaporative condenser for the compressed refrigerant located in said housing and embodying a coil in the high pressure refrigerant line and means for spraying liquid on the coil, and means for causing air to flow into the compartment via the inlet and around the compressor, then into the housing through the air opening and past the condenser coil, and then out via the air outlet.

2. A refrigerating apparatus comprising in combination means forming a compartment with an air inlet and an air outlet therefor, a housing provided with an inlet opening and disposed in the compartment remotely with respect to said air inlet, a refrigerant compressor disposed in the compartment adjacent to the inlet and having low and high pressure refrigerant lines leading from and to it respectively, an internal combustion engine positioned in the compartment next to the compressor and connected to drive the latter, an evaporative condenser for the compressed refrigerant located in the housing and embodying a coil in the high pressure refrigerant line and means for spraying liquid against the coil, and means for causing air to flow into the compartment via the air inlet and around and past the compressor and engine and into the housing through the air opening and past the condenser coil and out via said air outlet.

3. A refrigerating apparatus comprising in combination means forming a compartment with an air inlet and an air outlet therefor, a housing provided with an inlet opening and disposed in the compartment remotely with respect to said air inlet, a refrigerant compressor disposed in the compartment adjacent to the inlet and having low and high pressure refrigerant lines leading from and to it respectively, an internal combustion engine positioned in the compartment next to the compressor and connected to drive the latter, an evaporative condenser for the compressed refrigerant located in the housing and embodying a coil in the high pressure refrigerant line and means for spraying liquid against the coil, and a blower with an outlet in communication with the air outlet of the compartment connected to be driven by the engine and arranged so that during operation thereof it causes air to flow into the compartment via the inlet and around and past the compressor and engine, then into the housing through the air opening and past the condenser coil, and then out via the air outlet.

4. A refrigerating apparatus comprising in combination means forming a compartment with an air inlet and an air outlet therefor, a housing provided with an air inlet opening and disposed in the compartment remotely with respect to said air inlet, a refrigerant compressor disposed in the compartment in front of said air inlet and having high and low pressure refrigerant lines leading from and to it respectively, an internal combustion engine positioned in the compartment between the compressor and the housing and connected to drive the compressor, an evaporative condenser for the compressed refrigerant located in said housing and embodying a coil in the high pressure refrigerant line and means for spraying liquid towards said coil, and a blower with an inlet in communication with the housing interior and an outlet in registry with the air outlet of the compartment, connected for drive by the engine and arranged so that during operation thereof it operates to draw air into the compartment via the air inlet, then successively past the compressor and engine, then into the housing through the air opening and past the condenser coil, and finally to discharge the air under pressure via the air outlet.

5. A refrigerating apparatus comprising in combination means forming a compartment with an air inlet in one wall thereof and an air outlet in another wall and remote from the inlet, a housing disposed in the compartment adjacent the outlet and embodying a pair of sides and a rear end wall with an air inlet opening therein, a refrigerant compressor disposed in the compartment directly in front of the air inlet and having high and low pressure refrigerant lines leading from and to it respectively, an internal combustion engine disposed in the compartment between the compressor and the housing and connected to drive the compressor, an evaporative condenser for the compressed refrigerant located in said housing and embodying a coil on the high pressure refrigerant line and means for spraying liquid on the coil, and a blower in the front end of the housing and with an inlet communicating with the housing interior and an outlet in registry with the air outlet, connected for drive by the engine and arranged so that during operation thereof it operates to draw air into the compartment through the air inlet then successively past the compressor and engine, then along and past the sides of the housing and into the housing via the inlet opening in the rear end wall thereof, then past the condenser coil, and finally to discharge the air from the housing via said air outlet.

6. A refrigerating apparatus comprising in combination means forming a compartment with an air inlet and an air outlet therefor, a housing provided with an inlet opening and disposed in the compartment remotely with respect to said air inlet, a refrigerant compressor disposed in the compartment adjacent to said air inlet and having high and low pressure refrigerant lines leading from and to it respectively, an internal combustion engine for driving the compressor also disposed in the compartment adjacent to said air inlet and having a liquid type cooling system therefor with a radiator in the housing, an evaporative condenser for the compressed refrigerant located in said housing and embodying a coil in the high pressure refrigerant line and means for spraying liquid against the coil, and means for causing air to flow into the compartment via the air inlet then around the compressor and engine, then into the housing through the air opening and past the condenser coil and radiator, and finally out via the air outlet.

7. A refrigerating apparatus comprising in combination means forming a compartment with an air inlet in one wall thereof and an air outlet in another wall and remote from the inlet, a housing provided with an inlet opening and disposed in the compartment adjacent to the outlet, a refrigerant compressor disposed in the compartment directly in front of the air inlet and having high and low pressure refrigerant lines leading from and to it respectively, an internal combustion engine for driving the compressor disposed in the compartment between the compressor and the housing and having a liquid type cooling system therefor with a radiator in the housing, an evaporative condenser for the compressed refrigerant disposed in said housing and embodying a coil in the high pressure refrigerant line and means for spraying liquid onto the coil, and an engine driven blower with an inlet in communication with the housing interior and an outlet in communication with said air outlet, disposed between the engine and the housing and arranged so that during drive thereof by an engine it operates to draw air into the compartment via the air inlet then successively past the compressor and engine, then into the housing via said inlet opening and past the condenser coil and radiator, and finally to discharge the air under pressure via said air outlet.

8. A refrigerating apparatus comprising in combination means forming a compartment with an air inlet in one wall thereof and an air outlet in another wall and remote from the inlet, a housing disposed in the compartment adjacent to the outlet and embodying a pair of sides and a rear end wall remote from the air inlet and with an inlet opening therein, a refrigerant compressor disposed in the compartment adjacent to said air inlet and having high and low pressure refrigerant lines leading from and to it respectively, an internal combustion engine for driving the compressor disposed in the compartment between the compressor and the housing and having a liquid type cooling system therefor with a radiator in the inner end portion of the housing, an evaporative condenser for the compressed refrigerant disposed in the outer end portion of said housing and adjacent to the rear end wall and embodying a coil in the high pressure refrigerant line and means for spraying liquid against the coil, and an engine driven blower in the inner end portion of the housing but outwardly of the radiator and provided with an inlet in communication with the housing interior and an outlet in communication with said air outlet and arranged so that upon drive thereof it operates to draw air into the compartment via the air inlet, then successively past the compressor and engine and then along the sides of the housing and into the housing via said inlet opening, then successively past the condenser coil and the radiator, and finally to discharge the air under pressure through said air outlet.

9. The combination with a vehicle body having a main compartment with cooling means therefor and an auxiliary door-closed compartment with an air inlet and an air outlet, of a refrigerating unit disposed normally in the auxiliary compartment and comprising a compressor for supplying compressed refrigerant to the cooling means and a prime mover for driving the compressor, a mounting for the unit arranged to support the latter so that upon opening of the door of the auxiliary compartment it is shiftable from its normal position in the auxiliary compartment to an inspection position outside of said auxiliary compartment, and a prime mover actuated blower associated and shiftable with the unit and arranged and designed so that when it is in operation and the unit is in its normal position it operates to draw air into the auxiliary compartment via the air inlet and past the compressor and to discharge the air under pressure from said auxiliary compartment through said air outlet.

10. The combination with a vehicle body having a main compartment with cooling means therefor and an auxiliary door closed compartment with an air inlet and an air outlet, of a refrigerating unit disposed normally in the auxiliary compartment and comprising a compressor for supplying compressed refrigerant to the cooling means and an internal combustion engine for driving the compressor, a mounting for the unit arranged to support the latter so that upon opening of the door it is shiftable from its normal position in the auxiliary compartment to an inspection or repair position outside of said auxiliary compartment, and a blower associated and shiftable with the unit and consisting of a rotor connected for drive by the engine and a casing with an outlet arranged to register with the air outlet of the auxiliary compartment when the unit is in its normal position and adapted when it is in operation and the unit is in its normal position to draw air into the auxiliary compartment via the air inlet and past and around the compressor and engine and to discharge the air under pressure from the auxiliary compartment through said air outlet.

11. In combination with a vehicle body having a main compartment with cooling means therefor and an auxiliary door closed compartment disposed adjacent to the main compartment and provided with an air inlet and an air outlet, of a refrigerating unit disposed normally in the auxiliary compartment and comprising a compressor for supplying compressed refrigerant to the cooling means, an internal combustion engine for driving the compressor and a condenser for the compressed refrigerant, and a mounting for the unit arranged to support the latter so that upon opening of the door it is shifted from its normal position to an inspection position outside of said auxiliary compartment, and an engine driven blower associated and shiftable with the unit, provided with an outlet adapted when the unit is in its normal position to register with the air outlet of the auxiliary compartment and adapted during drive thereof by the engine to draw air into the auxiliary compartment via the inlet and past the compressor, engine and condenser and force the air under pressure from the auxiliary compartment via said air outlet.

12. In combination with a vehicle body having a main compartment with cooling means therefor and an auxiliary door closed compartment positioned adjacent to the main compartment and provided with an air inlet and an air outlet, of a refrigerating unit disposed normally in the auxiliary compartment and comprising a compressor for supplying compressed refrigerant to the cooling means, an internal combustion engine connected to drive the compressor and having a liquid type cooling system therefor with a radiator, and an evaporative condenser for the compressed refrigerant; a mounting for the unit arranged to support the latter so that upon opening of the door it is shiftable bodily from its normal position to an inspection position outside of said auxiliary compartment; and an engine driven blower embodying a casing with an outlet arranged to register with the air outlet of the auxiliary compartment when the unit is in its normal position and adapted upon drive thereof by the engine to draw air into the compartment via the air inlet and past the compressor, engine, condenser and radiator and then to discharge the air under pressure from said auxiliary compartment via the air outlet.

13. The combination with a vehicle body having a main compartment with cooling means therefor, and an elongated auxiliary compartment with an air inlet equipped door at one end thereof and an air outlet remote from the door, of a refrigerating unit disposed normally in the auxiliary compartment and comprising a compressor connected to supply compressed refrigerant to the cooling means and positioned adjacent to the door when the unit is in its normal position, an internal combustion engine connected to drive the compressor and positioned inwardly of the compressor, and an evaporative condenser disposed in an inlet opening equipped housing inwardly of the engine and adapted to condense the compressor compressed refrigerant; a mounting for the unit arranged to support the latter so that upon opening of the door it is shiftable from its normal position to an inspection position outside of said auxiliary compartment; and an engine driven blower associated and movable with the unit, embodying a casing with an outlet arranged to register with the air outlet of the auxiliary compartment when the unit is in its normal position and adapted upon drive by the engine to draw air into the auxiliary compartment via the inlet in the door, then past the compressor and engine, and then through the housing past the evaporative condenser, and finally to discharge the air under pressure from the auxiliary compartment via said outlet.

14. A refrigerating apparatus comprising in combination, an elongated supporting frame having at one end thereof a housing with an inlet therefor, a refrigerant compressor mounted on the other end of the frame and having high and low pressure refrigerant lines leading from and to it respectively, an internal combustion engine connected to drive the compressor and mounted on the frame between the housing and the compressor, an evaporative condenser for the compressed refrigerant disposed in said housing and embodying a coil in the high pressure refrigerant line and means for spraying water onto the coil, and an engine driven blower having a casing with an inlet in direct communication with the housing interior, and adapted upon drive thereof to cause air to flow into the housing via the inlet opening and past the condenser coil.

15. A refrigerating apparatus comprising in combination, an elongated supporting frame having at one end thereof a housing with an inlet opening therefor, a refrigerant compressor mounted on the other end of the frame and having high and low pressure refrigerant lines leading from and to it respectively, an internal combustion engine for driving the compressor mounted on the frame between said compressor and the housing and having a liquid type cooling system therefor with a radiator in the housing, an evaporative condenser for the compressed refrigerant disposed in said housing and embodying a coil in the high pressure refrigerant line, and an engine driven blower between the engine and the housing having a casing with an inlet in communication with the housing interior and adapted when driven by the engine to cause air to flow into the housing via the inlet opening and past the condenser coil and the radiator.

16. A refrigerating apparatus comprising in combination, an elongated supporting frame, a housing mounted on one end of the frame and comprising a bottom, sides, a top and an outer end wall with an inlet opening therein, a refrigerant compressor mounted on the frame exteriorly of the housing and having high and low pressure refrigerant lines leading from and to it respectively, an internal combustion engine for driving the compressor also mounted on the frame exteriorly of said housing and having a liquid type cooling system therefor with a radiator in the inner end portion of the housing, an evaporative condenser for the compressed refrigerant disposed in the outer end portion of said housing and embodying a coil in the high pressure refrigerant line and means for spraying liquid on the coil, and an engine driven blower having a casing positioned to form the inner end wall of the housing, provided with an inlet in communication with the housing interior, and adapted upon drive thereof by the engine to cause air to enter the housing via said inlet opening and thence to pass successively by the condenser coil and the radiator.

17. A refrigerating apparatus comprising in combination, an elongated supporting frame having at one end thereof an upstanding panel with holes therein and at its other end a housing embodying a bottom, sides, a top and a rear end wall with an inlet opening therein, a refrigerant compressor mounted in one of the holes in the panel and having high and low pressure refrigerant lines leading from and to it respectively, an internal combustion engine for driving the compressor mounted on the frame between the housing and the compressor and having a liquid type cooling system therefor with a radiator in the inner end portion of the housing, an evaporative condenser for the compressed refrigerant disposed in the outer end portion of the housing and embodying a coil in the high pressure refrigerant line and means for spraying liquid against the coil, and an engine driven blower embodying a casing in the inner end portion of the housing and outwardly of the radiator and with an air inlet in communication with the housing interior, and adapted during drive thereof by the engine to draw air into the housing via the inlet opening, then past the condenser coil and radiator.

18. The combination with a vehicle body having a main compartment with cooling means therefor and an auxiliary door-closed compartment, of a refrigerant unit disposed normally in the auxiliary compartment and comprising a refrigerant compressor with high and low pressure refrigerant lines leading from it to the cooling means and from the cooling means to it respectively, a prime mover for driving the compressor, and a condenser included in the high pressure refrigerant line; a mounting for the unit arranged to support the latter so that upon opening of the door of the auxiliary compartment it is shiftable from its normal position to an inspection position outside of said compartment; and a receiver for the condensed refrigerant fixedly secured in the auxiliary compartment and included in the high pressure refrigerant line between the condenser and the cooling means, said high pressure refrigerant line including a flexible connection between the receiver and the condenser whereby the unit may be shifted to and from its inspection position without disconnection of said high pressure line.

19. The combination with a vehicle body having a main compartment with cooling means therefor and an auxiliary door closed compartment, of a refrigerant unit disposed normally in the auxiliary compartment and comprising a refrigerant compressor and a prime mover for driving the compressor, a mounting for the unit arranged to support the latter so that upon opening of the door it is shiftable from its normal position to an inspection position outside of said auxiliary compartment, a latch device associated with said mounting and arranged releasably to secure the unit in its normal position, and means for preventing closing of the door of the auxiliary compartment when the unit is in its normal position and the latch device is in its unlocked position.

20. The combination with a vehicle body having a main compartment with cooling means therefor and an auxiliary door closed compartment, of a refrigerant unit disposed normally in the auxiliary compartment and comprising a refrigerant compressor and a prime mover for driving the compressor, a mounting for the unit arranged to support the latter so that upon opening of the door it is shiftable from its normal position to an inspection position outside of said auxiliary compartment, a pivoted handle equipped latch associated with the mounting for the unit and adapted releasably to lock the unit in its normal position, and a bracket on the door of the compartment arranged so that when the unit is in its normal position and the latch is in its unlocked position it engages the handle of the latch and prevents closing of the door.

LEE W. MELCHER.